United States Patent
Madden et al.

(10) Patent No.: US 6,880,408 B1
(45) Date of Patent: Apr. 19, 2005

(54) MECHANICAL AMPLIFIER SYSTEMS AND METHODS

(75) Inventors: Richard Madden, Groton, MA (US); Bruce Stuart Murray, Winchester, MA (US)

(73) Assignee: BBNT Solutions LLC, Cambridge, MA (US)

( * ) Notice: Subject to any disclaimer, the term of this patent is extended or adjusted under 35 U.S.C. 154(b) by 0 days.

(21) Appl. No.: 10/376,083

(22) Filed: Feb. 28, 2003

Related U.S. Application Data

(60) Provisional application No. 60/375,789, filed on Apr. 26, 2002.

(51) Int. Cl.[7] .............................................. G01L 1/00
(52) U.S. Cl. ...................................................... 73/782
(58) Field of Search ....................... 33/199 B; 180/253; 451/5; 73/782, 862.04, 862.043, 862.06, 862.041, 146, 862.625, 767, 763, 862.59; 310/328

(56) References Cited

U.S. PATENT DOCUMENTS

| | | | | |
|---|---|---|---|---|
| 4,440,031 A | * | 4/1984 | De Fazio | 73/862.04 |
| 5,109,701 A | * | 5/1992 | Jacobsen et al. | 73/782 |
| 5,359,902 A | | 11/1994 | Barger et al. | 73/862.626 |
| 6,157,115 A | * | 12/2000 | Hassler, Jr. | 310/328 |
| 6,422,089 B1 | | 7/2002 | Madden et al. | 73/779 |

* cited by examiner

*Primary Examiner*—Edward Lefkowitz
*Assistant Examiner*—Octavia Davis
(74) *Attorney, Agent, or Firm*—Ropes & Gray LLP

(57) ABSTRACT

A mechanical amplifier includes first and second amplifier mounting pads (110, 120) and first and second sensor mounting pads (130, 140). At least one of the first and second amplifier mounting pads (110, 120) receives a load or displacement. The first and second sensor mounting pads (130, 140) connect to the first and second amplifier mounting pads (130, 140) via flexible connecting members. A sensor (150) may connect to the first and second sensor mounting pads to measure the amount of load or displacement.

29 Claims, 9 Drawing Sheets

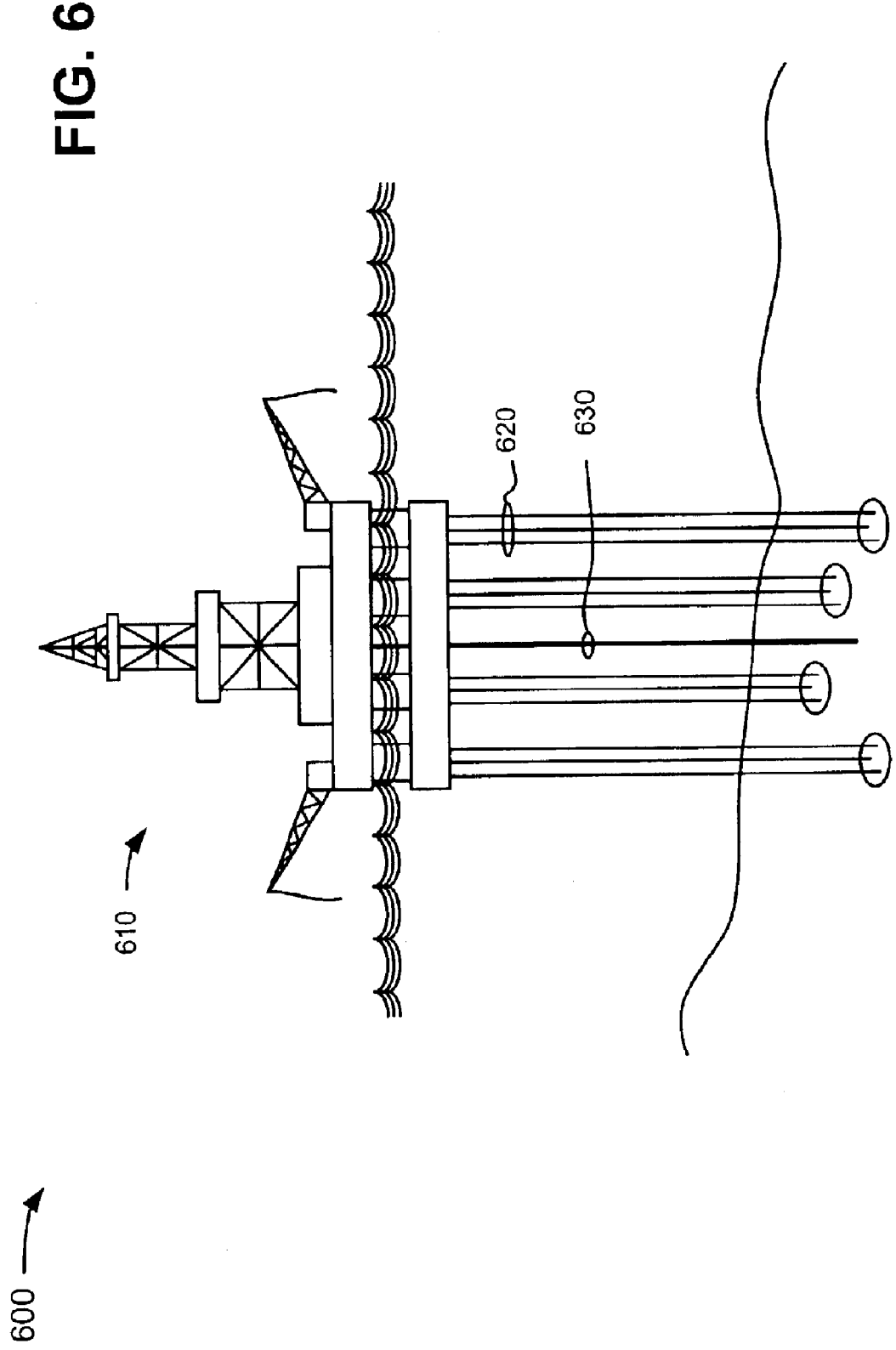

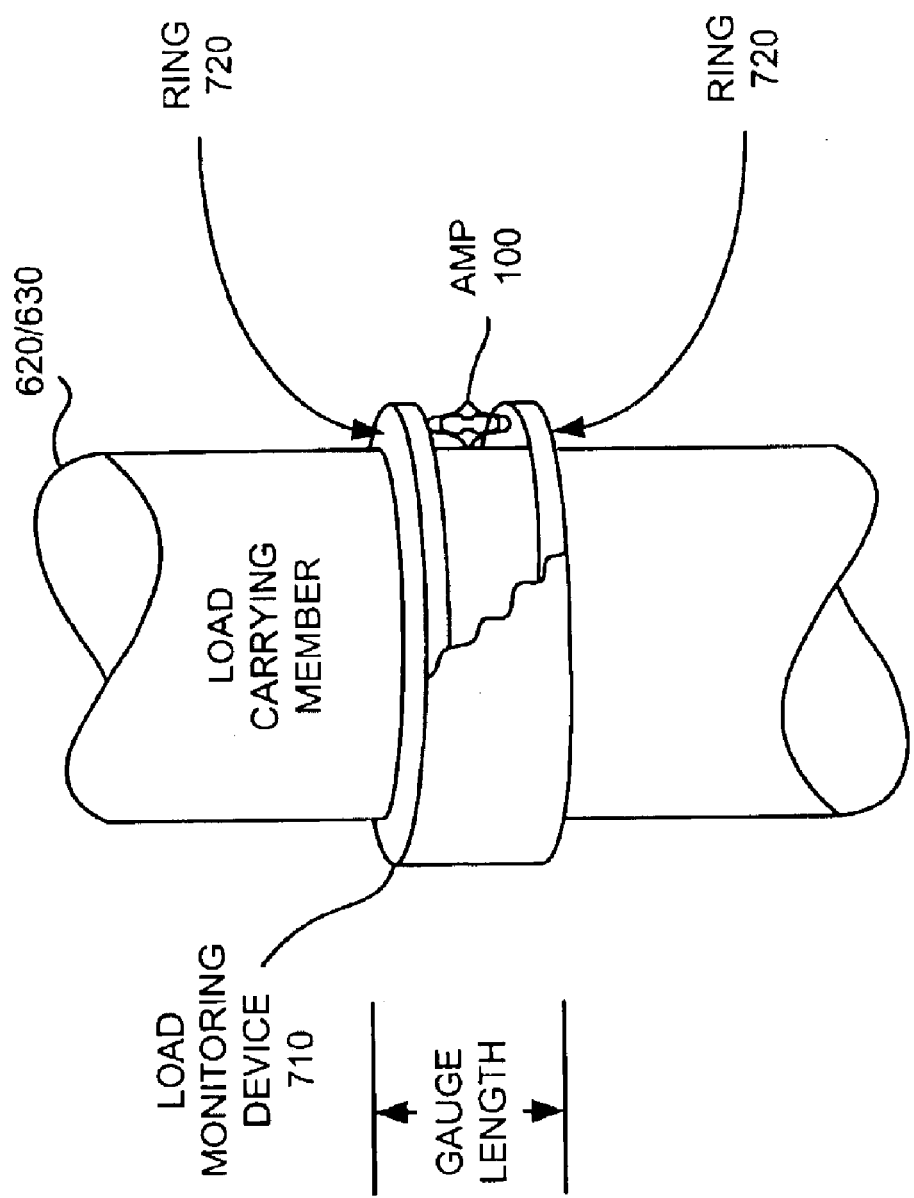

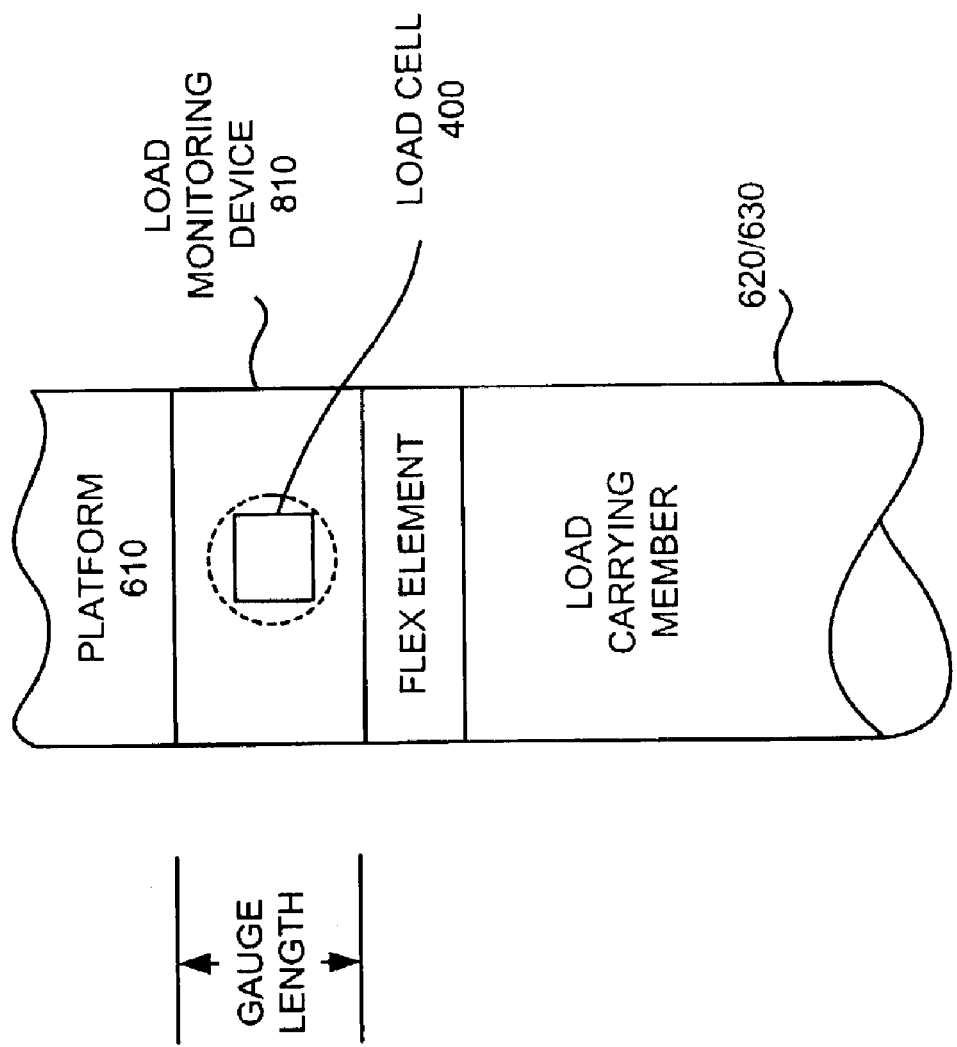

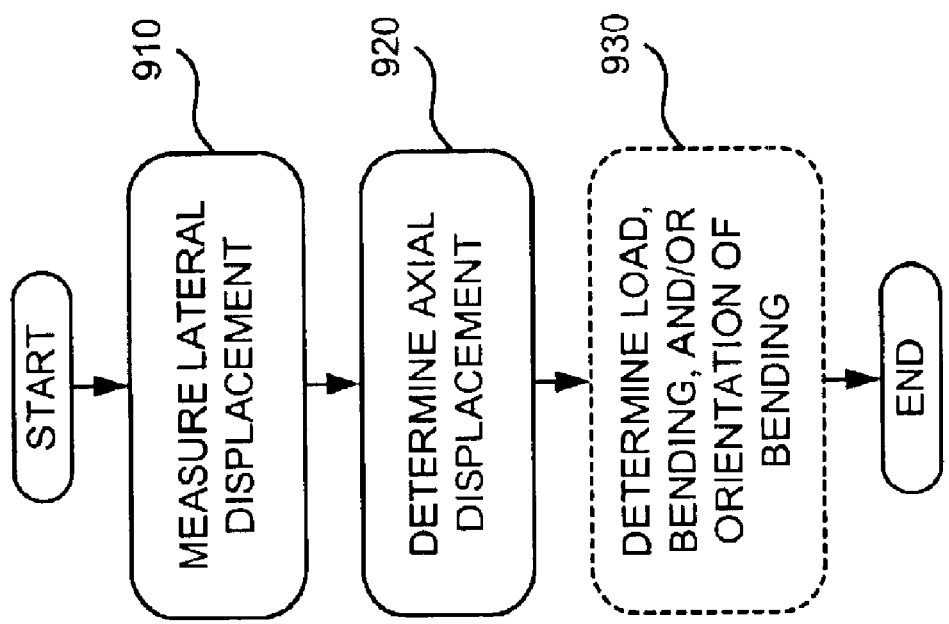

MECHANICAL AMPLIFIER SYSTEMS AND METHODS

RELATED APPLICATION

This application claims priority under 35 U.S.C. § 119 based on U.S. Provisional Application No. 60/375,789, filed Apr. 26, 2002, the disclosure of which is incorporated herein by reference.

BACKGROUND OF THE INVENTION

1. Field of the Invention

The present invention relates generally to the measurement of displacement and, more particularly, to mechanical amplifier systems and methods for measuring displacement. Such systems and methods may also be applicable to load monitoring systems and methods.

2. Description of Related Art

Monitoring of the load in load carrying members is very important in some applications. One load monitoring device uses variable reluctance sensors to measure the displacement in the direction of the applied load. The applied load is obtained by multiplying the displacement by the stiffness of the load carrying member. The precision of the measurement as a percentage of full scale load is determined by the ratio of the smallest displacement that the device can resolve to the displacement under full load.

The elements of such load monitoring devices typically include a load carrying member, a displacement measurement device (e.g., a sensor) with associated processing, and a mechanism for attaching the sensor to the load carrying member. The device measures the deformation of the load carrying member over a specific distance customarily referred to as the gauge length. The deformation of the load carrying member under load is directly proportional to this gauge length.

One application of load monitoring systems is in connection with moorings and risers in offshore oil production platforms. One such monitoring system includes a load monitoring device composed of a load measurement unit (LMU) that includes variable reluctance sensors attached to two rings around the periphery of a load carrying member to measure the load associated with that member. The LMU measures load based on the displacement between the two rings of sensors.

With a sufficient number of sensors, the LMU can measure load, bending, and orientation of bending. Due to limitations typically associated with displacement sensors, the gauge length of the LMU needs to be long to provide sufficient displacement to accurately measure these load-related features. For example, the gauge length of the LMU may be in the order of 36, 48, or 60 inches.

In some situations, it is important to reduce the gauge length of the devices. As a result, there is a need in the art for mechanisms to reduce the gauge length while maintaining the precision.

SUMMARY OF THE INVENTION

Systems and methods consistent with the present invention address this and other needs by providing a mechanical amplifier that magnifies the displacement of the load carrying member in the direction of an applied load to effectively increase the gauge length. As a result, the device can be constructed in a shorter length while maintaining the same precision.

In accordance with the principles of the invention as embodied and broadly described herein, a mechanical amplifier includes first and second amplifier mounting pads and first and second sensor mounting pads. At least one of the first and second amplifier mounting pads connects to a load carrying member. The first and second sensor mounting pads connect to the first and second amplifier mounting pads via flexible connecting members.

In another aspect consistent with the principles of the invention, a method for measuring a load is provided. The method includes receiving at least a portion of the load; measuring the amount of lateral displacement caused by the load, where the direction of the lateral displacement is approximately perpendicular to the direction of the load; determining the amount of axial displacement based on the amount of lateral displacement; and measuring the load based on the amount of axial displacement.

In another aspect consistent with the principles of the invention, a load monitoring device determines a load associated with a load carrying member. The load monitoring device includes multiple rings connected to the load carrying member and at least one amplifier. The amplifier(s) include (s) multiple amplifier mounting pads connected to the rings, multiple sensor mounting pads connected to the amplifier mounting pads via flexible connecting members, and a sensor connected to the sensor mounting pads and configured to measure the load associated with the load carrying member.

In a further aspect consistent with the principles of the invention, a load cell includes an upper end cap and a lower end cap, a housing, and one or more mechanical amplifiers. At least one of the upper end cap and the lower end cap is connected to receive a load. The housing connects to the upper end cap and the lower end cap. The one or more mechanical amplifiers are located within the housing and include multiple first mounting pads connected to the upper end cap and the lower end cap, multiple second mounting pads connected to the first mounting pads via flexible connecting members, and a sensor connected to the second mounting pads and configured to measure the load.

In a further aspect consistent with the principles of the invention, a mechanical amplifier includes first, second, third, and fourth mounting pads. The first and second mounting pads connect to first and second elements, where a displacement of at least one of the first and second elements causes an axial displacement of at least one of the first and second mounting pads. The third and fourth mounting pads connect to the first and second mounting pads via flexible connecting members, where the axial displacement of the at least one of the first and second mounting pads causes a lateral displacement of the third and fourth mounting pads, and the lateral displacement is approximately perpendicular to the axial displacement.

BRIEF DESCRIPTION OF THE DRAWINGS

The accompanying drawings, which are incorporated in and constitute a part of this specification, illustrate the invention and, together with the description, explain the invention. In the drawings.

FIG. 6 is a diagram of an exemplary environment in which load monitoring systems and methods consistent with the principles of the invention may be implemented;

FIG. 7 is an exemplary diagram of a load monitoring device configured as an in-line system according to an implementation consistent with the principles of the invention;

FIG. 8 is an exemplary diagram of a load monitoring device configured as a top-mounted system according to an implementation consistent with the principles of the invention; and FIG. 9 is a flowchart of exemplary processing for determining displacement or load associated with a load carrying member according to an implementation consistent with the principles of the invention.

DETAILED DESCRIPTION

The following detailed description of the invention refers to the accompanying drawings. The same reference numbers in different drawings may identify the same or similar elements. Also, the following detailed description does not limit the invention. Instead, the scope of the invention is defined by the appended claims and equivalents.

Systems and methods consistent with the present invention provide a mechanical amplifier that measures displacement and magnifies that displacement in a load monitoring device in the direction of the applied load to effectively increase the gauge length of the load monitoring device. As a result, the load monitoring device can be constructed in a shorter length while maintaining the same precision. Reducing the size of the load monitoring device has the double benefit of reducing the cost of fabrication of the load monitoring device and allowing it to be used in situations where there are height restrictions.

Exemplary Mechanical Amplifier

Figure 1:
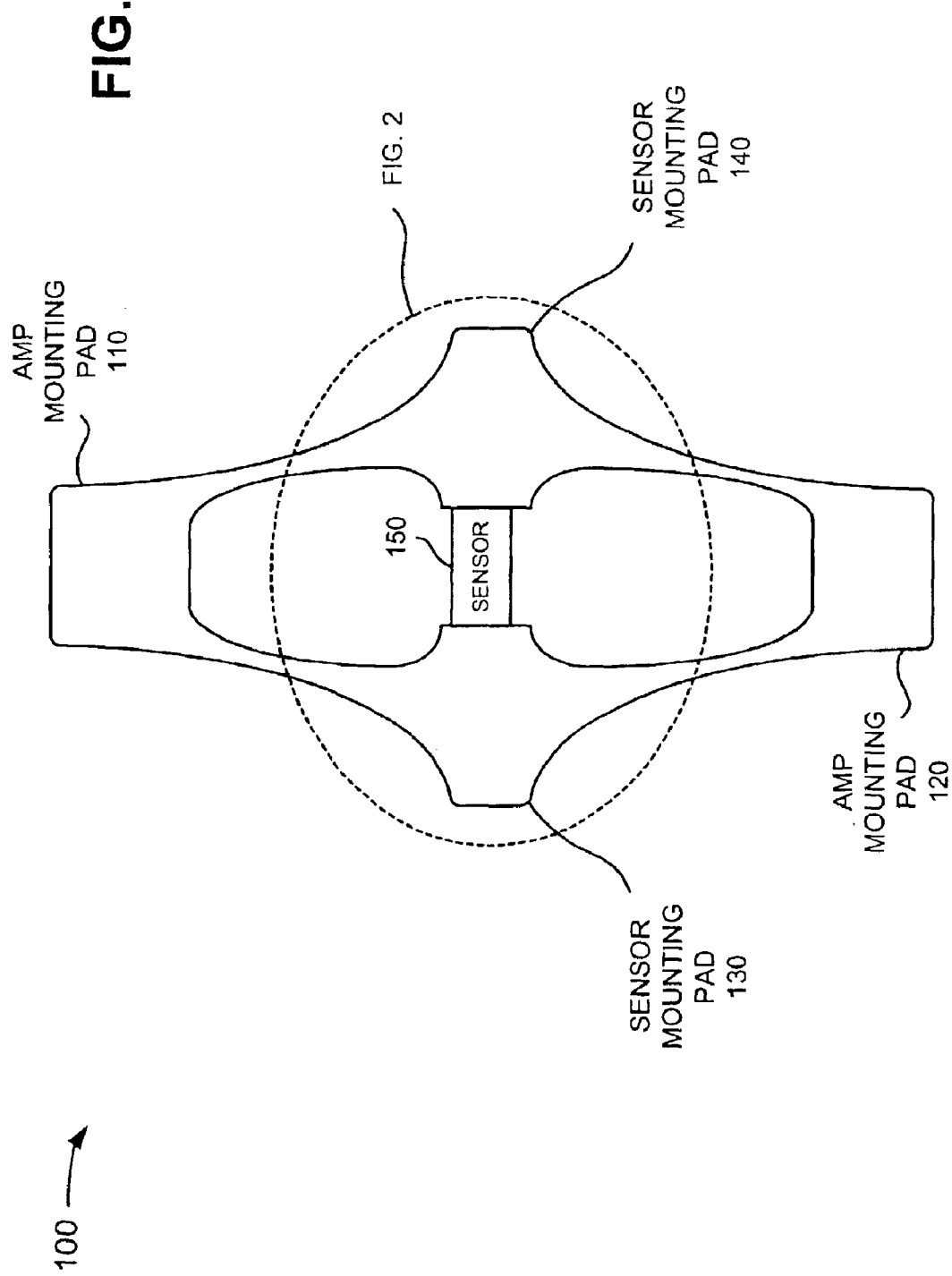
FIG. 1 is an exemplary diagram of a mechanical amplifier consistent with the principles of the invention.

FIG. 1 is an exemplary diagram of an amplifier 100 according to an implementation consistent with the principles of the invention. Amplifier 100 may be constructed of a material that has a linear stress/strain curve. Exemplary materials might include titanium (e.g., 6AL-4V titanium) or stainless steel (17-4PH stainless steel). Amplifier 100 may be configured to directly or indirectly receive a force or displacement. For example, amplifier 100 may be associated with a load carrying member. In this case, amplifier 100 may be constructed such that it is much less stiff than the load carrying member for which it measures load. As a result, amplifier 100 may carry a very small percentage of the load (e.g., less than 0.01%).

Amplifier 100 may include amplifier (AMP) mounting pads 110 and 120, sensor mounting pads 130 and 140, and sensor 150. Amplifier mounting pads 110 and 120 connect to sensor mounting pads 130 and 140 via flexible connecting members. Amplifier mounting pads 110 and 120 may connect to measure load and/or displacement. Sensor mounting pads 130 and 140 may connect to sensor 150.

Sensor 150 may include any device that is capable of measuring deflection, such as a variable reluctance sensor (e.g., similar to the sensor described in U.S. Pat. Nos. 5,359,902 and 6,422,089) or a linear variable differential transformer (LVDT).

Figure 2:
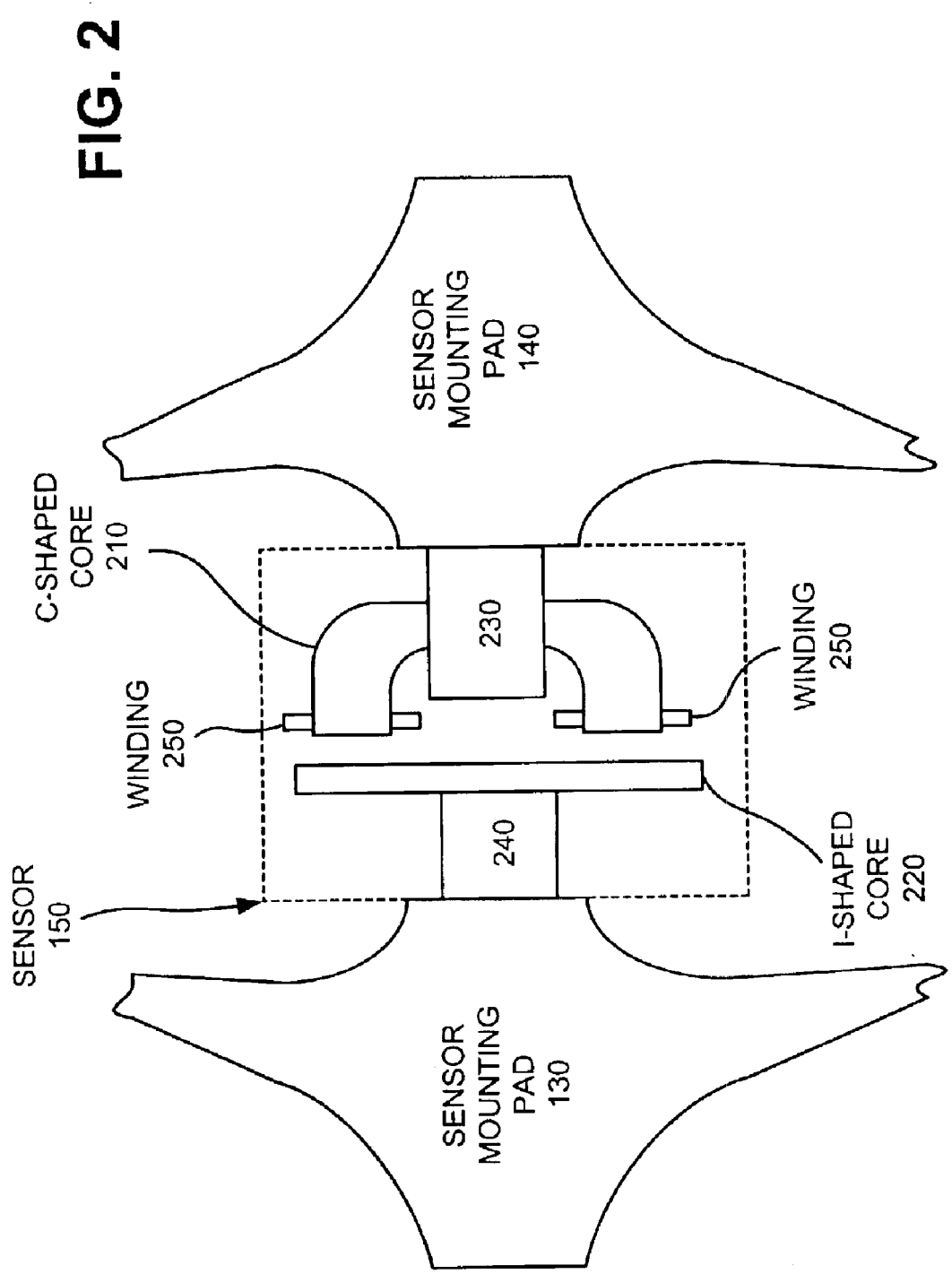
FIG. 2 is an exemplary diagram of the mechanical amplifier of FIG. 1 with a variable reluctance sensor attached according to an implementation consistent with the principles of the invention.

FIG. 2 is an exemplary diagram of a sensor 150 according to an implementation consistent with the principles of the invention. Sensor 150 may include a variable reluctance sensor or capacitive sensor. Sensor 150 may include C-shaped magnetic core 210, I-shaped magnetic core 220, brackets 230 and 240, and windings 250. C-shaped magnetic core 210 may be constructed, for example, of a highly permeable laminated transformer material. C-shaped core 210 may be mounted on sensor mounting pad 140 via bracket 230 with the ends of the C-shape pointed in the direction of I-shaped magnetic core 220, which is a direction generally perpendicular to the direction of the force or displacement applied to amplifier 100.

I-shaped magnetic core 220 may be constructed, for example, of a highly permeable laminated transformer material. I-shaped magnetic core 220 may be mounted on sensor mounting pad 130 via bracket 240. I-shaped core 220 may be positioned so that narrow gaps exist between each end of C-shaped core 210 and a facing portion of I-shaped core 220. In an implementation consistent with the principles of the invention, the widths of the gaps are small as compared with the transverse dimension of the ends of C-shaped core 210. Further, the cross-sectional dimensions or areas of the ends of C-shaped core 210 may be smaller than those of the facing portion of I-shaped core 220.

Windings 250 may be mounted around each end of C-shaped core 210 closely adjacent to the respective gap. Windings 250 may connect in series so that their electromotive forces add. As will be understood by those skilled in the art, C-shaped core 210 and I-shaped core 220 may be highly permeable and, thus, the gaps between cores 210 and 220 may constitute most of the reluctance in the magnetic circuit linking windings 250.

When sensor mounting pads 130 and 140 move away from or toward each other, the width of the respective gap between each end of C-shaped core 210 and the adjacent portion of I-shaped core 220 increases or decreases. Decreases in the width of the gaps lead to increases in the inductance exhibited. Both of the gaps may be used in determining the value of inductance. As a result, small increases in the width of one gap can compensate for or offset small decreases in the width of the other gap. Accordingly, sensor 150 may be relatively insensitive to bending moments applied thereto.

Figure 3:
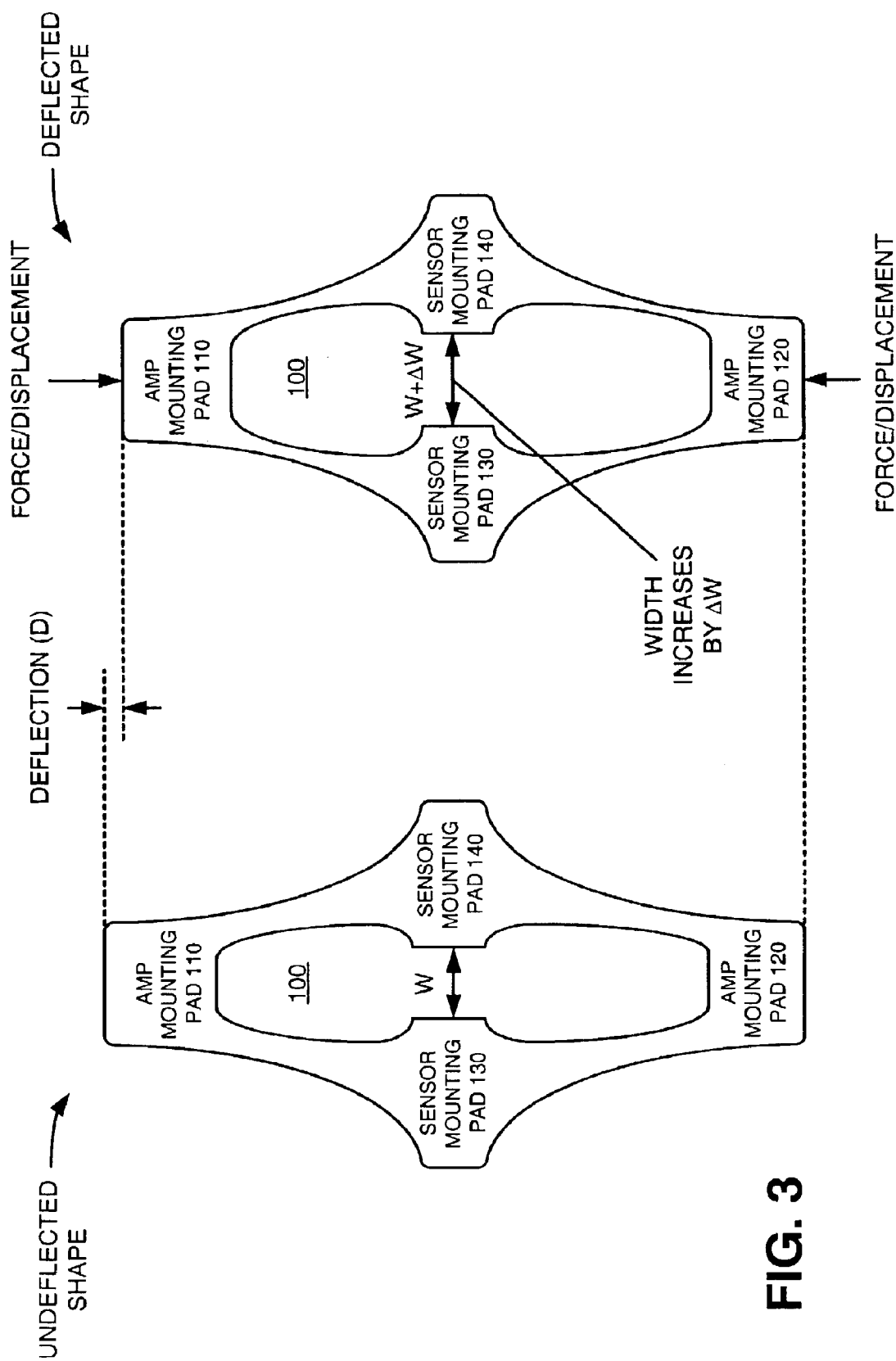
FIG. 3 illustrates the possible impact of force and displacement on the amplifier of FIG. 1.

Returning to FIG. 1, sensor 150 may measure the amount of displacement of sensor mounting pads 130 and 140 caused by a load or displacement experienced by amplifier mounting pad 110 and/or amplifier mounting pad 120. FIG. 3 is an exemplary diagram of the impact of certain loads and/or displacement on amplifier 100 according to an implementation consistent with the principles of the invention. For example, a force or displacement experienced by amplifier mounting pad 110 and/or amplifier mounting pad 120 in the direction shown in FIG. 3 ("axial direction") causes displacement of sensor mounting pads 130 and 140 in a direction away from each other ("lateral direction"). According to an implementation consistent with the principles of the invention, amplifier 100 may be designed such that the amount of displacement in the lateral direction (illustrated as width increase ΔW) is greater than the amount of displacement in the axial direction (illustrated as deflection D).

When the force or displacement experienced by amplifier mounting pad 110 and/or amplifier mounting pad 120 is in a direction opposite to that shown in FIG. 3, the displacement in the lateral direction by sensor mounting pads 130 and 140 will be in a direction toward each other. In this case, the amount of displacement in the lateral direction is a width decrease (ΔW) that is greater than the amount of displacement (D) in the axial direction.

In various implementations consistent with the principles of the invention, amplifier 100 may be used to measure the load associated with a load carrying member. In some of these implementations ("direct load implementations"), amplifier 100 may operate within a load monitoring device that receives all of the load. In the direct load implementations, the load monitoring device may act as a standalone device or take the form of a load cell. In other implementations ("indirect load implementations"), amplifier 100 may operate within a load monitoring device that is parallel to the load. In the indirect load implementations, the load monitoring device may be much less stiff than the load carrying member whose load is to be measured. As a result, the load monitoring device experiences an insignificant amount of the load.

In a direct load implementation, amplifier 100 may measure the load based on the displacement of sensor mounting pads 130 and 140 in the lateral direction. For example, amplifier 100 may be constructed such that the ratio of the displacement in the lateral direction to the displacement in the axial direction is approximately four. Therefore, by measuring the amount of lateral displacement using sensor 150, the amount of axial displacement and, thus, the amount of load experienced by amplifier 100 can be determined. For example, the amount of load may be determined by multiplying the amount of axial displacement experienced by amplifier 100 by the stiffness of amplifier 100.

In an indirect load implementation, the deflection of amplifier 100 in the direction of the applied load (axial direction) may be effectively equal to the displacement of the load carrying member. On the other hand, the displacement between sensor mounting pads 130 and 140 in the direction approximately perpendicular to the direction of the applied load (lateral direction) will be greater. In one implementation consistent with the principles of the invention, the ratio of the lateral displacement to the axial displacement is approximately four. Therefore, by measuring the amount of lateral displacement using sensor 150, the amount of axial displacement and, thus, the amount of load caused by the load carrying member can be determined. For example, the amount of load may be determined by multiplying the amount of axial displacement experienced by amplifier 100 by the stiffness of the load carrying member over the gauge length.

The load measurement precision may be determined from the ratio of the incremental lateral displacement caused by the load to the minimum lateral displacement that can be measured. This incremental lateral displacement is a linear function of the gauge length. Therefore, the fact that the lateral displacement is a multiple of the axial displacement allows the gauge length of the load monitoring device to be reduced by that same multiple while maintaining the same precision. In one implementation consistent with the principles of the invention, the multiple is approximately a factor of four. This allows the precision of the load monitoring device to be maintained even though its gauge length is reduced by a factor of four. In practice, the particular amount of reduction in the gauge length of the load monitoring device may be changed by, for example, changing the design of amplifier 100 (e.g., the material and geometry used for amplifier 100).

Exemplary Load Cell Configurations

Figure 4:
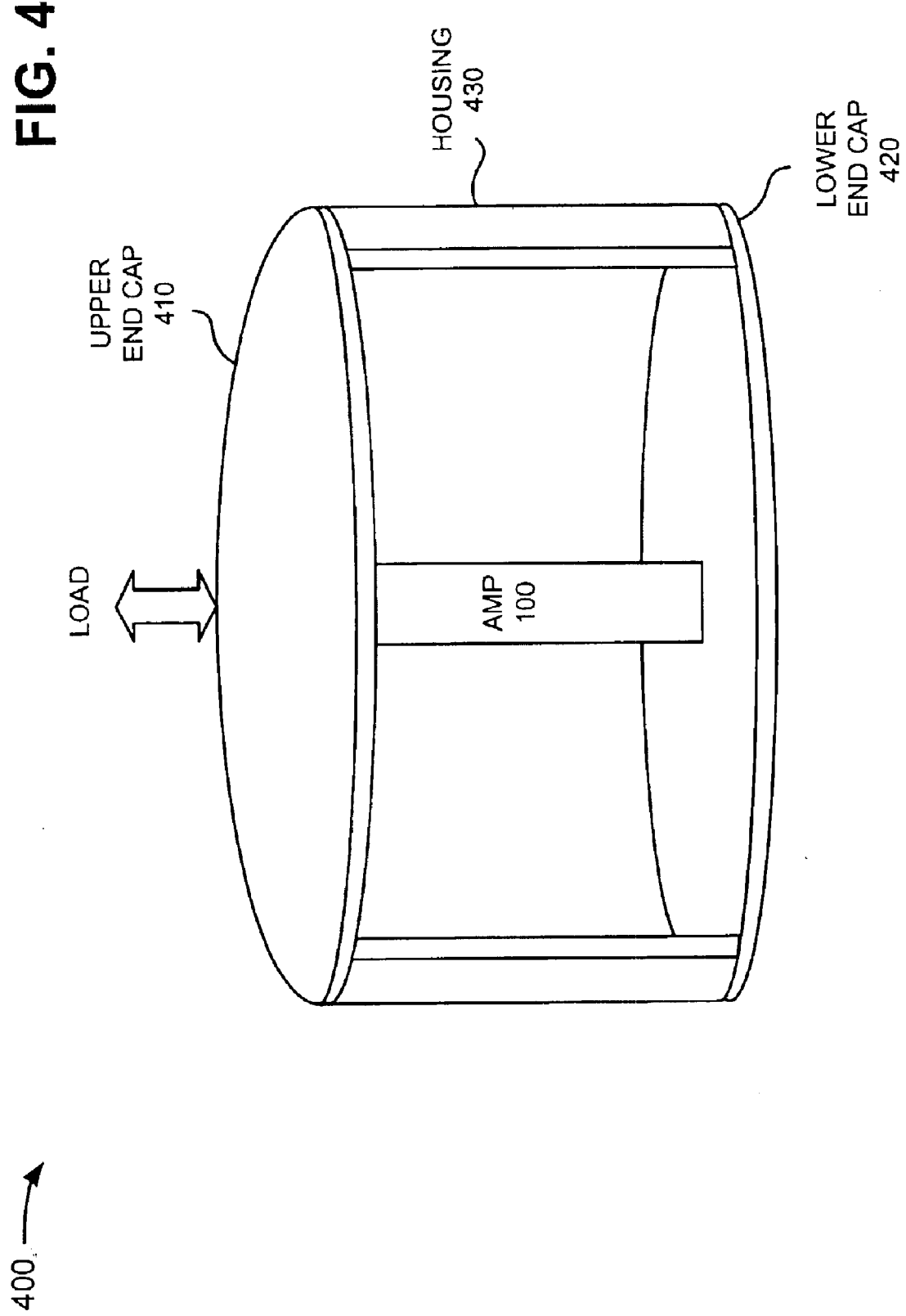
FIG. 4 is an exemplary diagram of a load cell according to an implementation consistent with the principles of the invention.

FIG. 4 is an exemplary diagram of a load cell 400 according to an implementation consistent with the principles of the invention. Load cell 400 may include an upper end cap 410, a lower end cap 420, and an outer housing 430. Upper end cap 410 may include a rigid, or semi-rigid material that may be rounded at the top to concentrate any load experienced through the center of load cell 400. Lower end cap 420 may also include a rigid, or semi-rigid, material. End caps 410 and 420 may connect to the ends of housing 430. In another implementation consistent with the present invention, end caps 410 and 420 are not separate from, but are integral with, housing 430. End caps 410 and 420 also connect to receive a load, possibly associated with a load carrying member.

Housing 430 may be of circular cross-section and act as an elastic element for forces applied in a direction along the axis of housing 430. In another implementation, housing 430 may have a shape other than a circular cross-section. Housing 430 may, for example, be constructed of a high grade steel that has a very repeatable and essentially linear elasticity. Within housing 430 may be located an amplifier, such as amplifier (AMP) 100 (FIG. 1). Amplifier mounting pads 110 and 120 (FIG. 1) of amplifier 100 may connect to end caps 410 and 420.

As described above with regard to FIGS. 1–3, a load experienced by amplifier mounting pads 110 and 120, may cause a displacement of amplifier mounting pads 110 and 120 in the axial direction, which, in turn, may cause a displacement of sensor mounting pads 130 and 140 in the lateral direction. As described above, by measuring the amount of lateral displacement using sensor 150, the amount of axial displacement and, thus, the amount of load exerted by the load carrying member can be determined.

Figure 5:
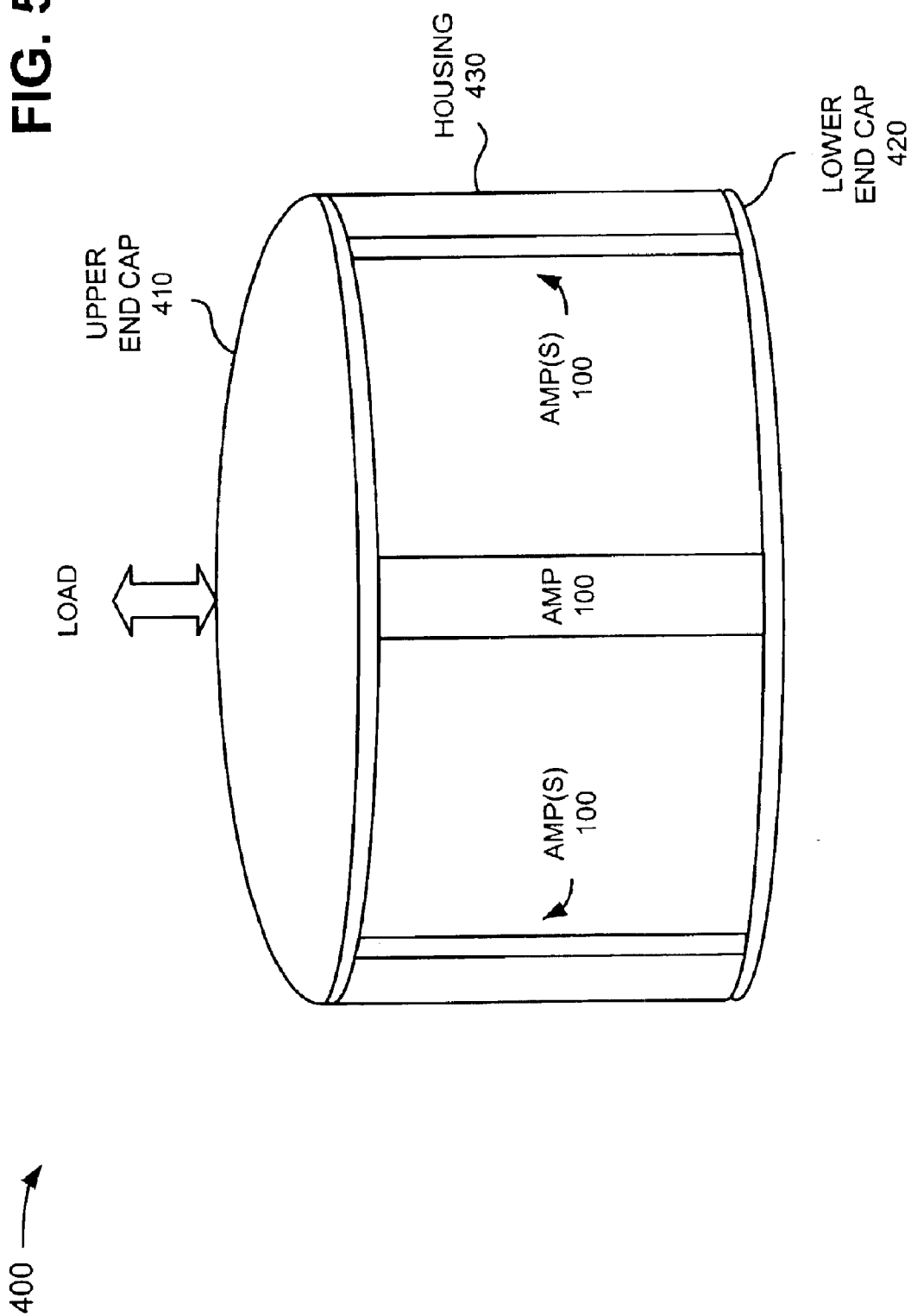
FIG. 5 is an exemplary diagram of a load cell according to another implementation consistent with the principles of the invention.

In another implementation consistent with the principles of the invention, load cell 400 may include more than one amplifier 100. FIG. 5 is an exemplary diagram of load cell 400 according to another implementation consistent with the principles of the invention. In this implementation, there are two or more amplifiers (AMPs) 100 (FIG. 1) located around the periphery of housing 430. In a typical implementation, there may be three to twelve amplifiers 100 located around the periphery of housing 430.

Exemplary Load Monitoring Device Configurations

FIG. 6 is a diagram of an exemplary environment 600 in which load monitoring systems and methods consistent with the principles of the invention may be implemented. As shown in FIG. 6, environment 600 may be associated with a floating production system, such as a floating offshore oil platform 610. Platform 610 may be secured to the sea floor via chains or tendons, such as moorings 620. Oil, gas, and/or water may be extracted and provided to platform 610 and/or exported via one or more tubes, such as riser 630. It may be important to monitor the load and tension associated with moorings 620 and riser 630 to make sure that moorings 620 and riser 630 are not loose or overstrained, possibly, to the point of breakage, and that platform 610 is stable.

While load monitoring systems and methods consistent with the principles of the invention will be described within environment 600, such systems and methods are not so limited. In fact, systems and methods consistent with the present invention may be used in any environment where it may be useful to monitor the load of a load carrying member.

One or more load monitoring devices may be associated with each load carrying member, such as moorings 620 and riser 630. The load monitoring devices can be generally configured as an in-line system that monitors the load in the load carrying member or a top-mounted system that measures the load transmitted by the load carrying member to platform 610.

FIG. 7 is an exemplary diagram of a load monitoring device 710 configured as an in-line system according to an implementation consistent with the principles of the invention. Load monitoring device 710 may include two rings 720 welded to an instrumentation joint that is welded or bolted to the load carrying member below where it attaches to the platform. One or more amplifiers 100 (FIG. 1) may connect to the two rings around the periphery of the load carrying member. To effectively measure load, bending, and orientation of bending associated with a load carrying member, three or more amplifiers 100 may connect between the two rings.

Through use of amplifier(s) 100 consistent with the principles of the invention, the effective gauge length of load monitoring device 710 may be reduced while maintaining the same precision. When the load carrying member is a tendon, such as mooring 620, the effective gauge length of load monitoring device 710 may be approximately ten to fifteen inches, as compared to forty-eight to sixty inches in load monitoring devices not using an amplifier 100. When the load carrying member is a tube, such as riser 630, the effective gauge length of load monitoring device 710 may be approximately nine inches, as compared to thirty-six inches in load monitoring devices not using an amplifier 100.

FIG. 8 is an exemplary diagram of a load monitoring device 810 configured as a top-mounted system according to an implementation consistent with the principles of the invention. Load monitoring device 810 may be configured as a collar that connects between a flexible (flex) element 820 and platform 610. Flexible element 820 facilitates connection of the load carrying member to platform 610.

The collar may include one or more load cells, such as load cell 400, connected to measure the load associated with the load carrying member. To effectively measure load, bending, and orientation of bending associated with the load carrying member, the collar may include three or more load cells 400. Through use of load cells 400 consistent with the principles of the invention, load monitoring device 810 may include more than the three load cells typically included in conventional systems, thereby increasing redundancy.

Other Exemplary Configurations

While mechanical amplifier systems and methods have been described in various contexts, mechanical amplifiers consistent with the principles of the invention may be used by themselves or as part of a measurement device to measure displacement (i.e., the relative position of two elements) and/or load (possibly associated with a load carrying member). For example, one or more mechanical amplifiers consistent with the principles of the invention may be used to measure displacement in connection with an earthquake detection device.

Exemplary Processing

FIG. 9 is a flowchart of exemplary processing for determining displacement or load associated with a load carrying member according to an implementation consistent with the principles of the invention. Processing may begin with an amplifier 100 (FIG. 1) experiencing a load or displacement directly (direct load situation) or indirectly (indirect load situation). For example, amplifier 100 may be associated with a load monitoring device that measures the load (directly or indirectly) associated with a load carrying member.

Sensor 150 may measure the displacement caused as a result of the load/displacement (act 910). For example, sensor 150 may measure the amount of displacement of sensor mounting pads 130 and 140 that occurs due to a load or displacement experienced by amplifier mounting pads 110 and 120.

The amount of lateral displacement may be used to determine the amount of axial displacement due to the load/displacement (act 920). For example, the construction of amplifier 100 (e.g., geometry and material used for amplifier 100) may be such that the amount of axial displacement is proportional to the amount of lateral displacement. In one implementation consistent with the principles of the invention, the amount of lateral displacement is four times greater than the amount of axial displacement.

From the axial displacement, the amount of load may be determined (act 930). In the direct load situation, the load may be determined by multiplying the axial displacement of amplifier 100 by the stiffness of amplifier 100. In the indirect load situation, the load may be determined by multiplying the axial displacement of amplifier 100 by the stiffness of the load carrying member over the gauge length.

Bending and orientation of bending associated with the load carrying member may also be determined (act 930). Conventional techniques may be used to determine bending and orientation of bending using three or more amplifiers 100.

Conclusion

Systems and methods consistent with the present invention provide a mechanical amplifier that measures displacement and/or load. When associated with a load monitoring device, the mechanical amplifier may magnify the displacement in the direction of the applied load to effectively increase the gauge length of the load monitoring device. As a result, the load monitoring device can be constructed in a shorter length while maintaining the same precision. Reducing the size of the load monitoring device may reduce the cost of fabrication of the device and permit the device to be used in situations where there are height restrictions.

The foregoing description of preferred embodiments of the present invention provides illustration and description, but is not intended to be exhaustive or to limit the invention to the precise form disclosed. Modifications and variations are possible in light of the above teachings or may be acquired from practice of the invention. For example, while a series of acts has been described with regard to FIG. 9, the order of the acts may differ in other implementations consistent with the present invention. Also, non-dependent acts may be performed in parallel.

No element, act, or instruction used in the description of the present application should be construed as critical or essential to the invention unless explicitly described as such. Also, as used herein, the article "a" is intended to include one or more items. Where only one item is intended, the term "one" or similar language is used. The scope of the invention is defined by the claims and their equivalents.

What is claimed is:

1. A mechanical amplifier, comprising:
   first and second amplifier mounting pads, at least one of the first and second amplifier mounting pads connecting to a load carrying member;
   first and second sensor mounting pads connected to the first and second amplifier mounting pads via flexible connecting members; and
   a sensor connected to the first and second sensor mounting pads.

2. The mechanical amplifier of claim 1,
   wherein the sensor is configured to measure an amount of load experienced by the load carrying member.

3. The amplifier of claim 2, wherein the load causes an axial displacement of the first and second amplifier mounting pads, the axial displacement of the first and second amplifier mounting pads causing a lateral displacement of the first and second sensor mounting pads, the lateral displacement being approximately perpendicular to the axial displacement.

4. The amplifier of claim 3, wherein the sensor measures the lateral displacement.

5. The amplifier of claim 3, wherein an amount of the lateral displacement is proportional to an amount of the axial displacement.

6. The amplifier of claim 5, wherein the amount of lateral displacement is approximately four times greater than the amount of axial displacement.

7. The amplifier of claim 1, wherein the amplifier is designed to be less stiff than the load carrying member.

8. The amplifier of claim 7, wherein a load causes an axial displacement of the first and second amplifier mounting pads and an amount of the load is determined by multiplying an amount of the axial displacement by a stiffness of the load carrying member over a gauge length.

9. The amplifier of claim 1, wherein a load causes an axial displacement of the first and second amplifier mounting pads and an amount of the load is determined by multiplying an amount of the axial displacement by a stiffness of the amplifier.

10. The amplifier of claim 1, wherein the amplifier is constructed of a material that has a linear stress/strain curve.

11. The amplifier of claim 1, wherein the amplifier is constructed of at least one of titanium and steel.

12. A system for measuring load associated with a load carrying member, comprising:
   means for receiving a force associated with a load carrying member;
   means for measuring an amount of lateral displacement caused by the force, a direction of the lateral displacement being approximately perpendicular to a direction of the force;
   means for determining an amount of axial displacement based on the amount of lateral displacement; and
   means for determining an amount of force associated with the load carrying member based on the amount of axial displacement.

13. A load monitoring device that determines a load associated with a load carrying member, comprising:
   a plurality of rings connected to the load carrying member; and
   at least one amplifier including:
      a plurality of amplifier mounting pads connected to the rings,
      a plurality of sensor mounting pads connected to the amplifier mounting pads via flexible connecting members, and
      a sensor connected to the sensor mounting pads and configured to measure the load associated with the load carrying member.

14. The device of claim 13, wherein the at least one amplifier is constructed of a material that is less stiff than the load carrying member.

15. The device of claim 13, wherein the at least one amplifier is constructed of a material that has a linear stress/strain curve.

16. The device of claim 13, wherein the load causes an axial displacement of one or more of the amplifier mounting pads, the axial displacement of the one or more amplifier mounting pads causing a lateral displacement of the sensor mounting pads, the lateral displacement being approximately perpendicular to the axial displacement.

17. The device of claim 16, wherein the sensor measures the lateral displacement.

18. The device of claim 16, wherein an amount of the lateral displacement is proportional to an amount of the axial displacement.

19. The device of claim 18, wherein the amount of lateral displacement is approximately four times greater than the amount of axial displacement.

20. A method for measuring a load, comprising:
   receiving at least a portion of the load;
   measuring an amount of lateral displacement caused by the load, a direction of the lateral displacement being approximately perpendicular to a direction of the load;
   determining an amount of axial displacement based on the amount of lateral displacement; and
   measuring the load based on the amount of axial displacement.

21. The method of claim 20, wherein the amount of axial displacement is proportional to the amount of lateral displacement.

22. The method of claim 21, wherein the amount of lateral displacement is approximately four times greater than the amount of axial displacement.

23. The method of claim 20, wherein the load causes the axial displacement, the axial displacement causes the lateral displacement, and the lateral displacement is approximately perpendicular to the axial displacement.

24. The method of claim 20, wherein the load is associated with a load carrying member; and
   wherein the measuring the load includes:
   multiplying an amount of the axial displacement by a stiffness of the load carrying member over a gauge length.

25. The method of claim 20, wherein at least a portion of the method is performed by an amplifier; and
   wherein the measuring the load includes:
   multiplying an amount of the axial displacement by a stiffness of the amplifier.

26. A mechanical amplifier, comprising:
   first and second mounting pads, the first and second mounting pads connecting to first and second elements, a displacement of at least one of the first and second elements causing an axial displacement of at least one of the first and second mounting pads; and
   third and fourth mounting pads connected to the first and second mounting pads via flexible connecting members, the axial displacement of the at least one of the first and second mounting pads causing a lateral displacement of the third and fourth mounting pads, the lateral displacement being approximately perpendicular to the axial displacement.

27. The amplifier of claim 26, wherein the amplifier is implemented within a load/displacement measuring device that includes a sensor connected to the third and fourth mounting pads and configured to determine an amount of displacement of the first and second elements by measuring the lateral displacement.

28. The amplifier of claim 26, wherein an amount of axial displacement is proportional to an amount of lateral displacement.

29. The amplifier of claim 28, wherein the amount of lateral displacement is approximately four times greater than the amount of axial displacement.

* * * * *